W. MEYER.
RECTIFIER.
APPLICATION FILED MAR. 30, 1908.
972,892.
Patented Oct. 18, 1910.
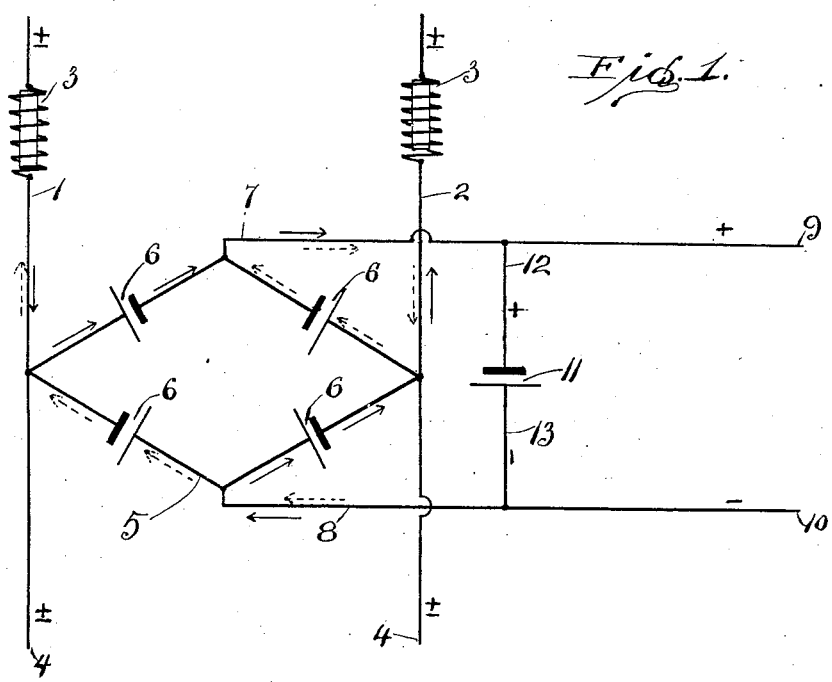
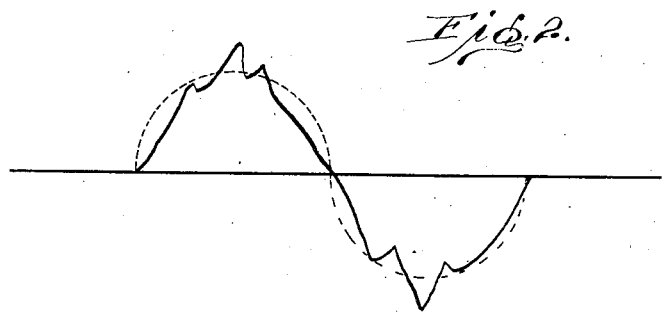
WITNESSES:
C. H. Fesler
O. F. Kitchin
INVENTOR
William Meyer,
BY Edgar M. Kitchin,
his Attorney.

UNITED STATES PATENT OFFICE.

WILLIAM MEYER, OF CHICAGO, ILLINOIS.

RECTIFIER.

972,892.   Specification of Letters Patent.   Patented Oct. 18, 1910.

Application filed March 30, 1908. Serial No. 424,230.

*To all whom it may concern:*

Be it known that I, WILLIAM MEYER, a citizen of the United States, residing at Chicago, in the county of Cook and State of Illinois, have invented certain new and useful Improvements in Rectifiers; and I do hereby declare the following to be a full, clear, and exact description of the invention, such as will enable others skilled in the art to which it appertains to make and use the same.

This invention relates to improvements in alternating current rectifiers, and the object in view is the rectifying of the sine waves of the alternating current and the transforming of the current to a direct current for delivering a smooth, even current free from fluctuations.

With this and further objects in view, the invention comprises certain novel constructions, combinations and arrangements of parts as will be hereinafter fully described and claimed.

In the accompanying drawing:—Figure 1 is a conventional showing of a structure embodying the features of this invention. Fig. 2 is a graphic presentation of the alternating current sine waves as ordinarily delivered seen in full lines with the true sine curve indicated in dotted lines.

It has been common heretofore to transform an alternating current into a direct current by a balanced system of asymmetrical cells, but the direct current thus produced is of little or no value for therapeutical purposes, owing to the fact that the alternating current waves do not follow the true sine curve, and therefore the direct current delivered from the rectifier has heretofore been pulsating and as each fluctuation in potential produces a very painful sensation it has been common to obtain current by other sources as for instance from a battery of galvanic cells, but this latter method of obtaining current has been found expensive, and the battery cumbersome to maintain.

I propose by the present invention to transform an alternating current into a direct current and to eliminate the pulsations from the current, and in order to accomplish this result I provide a structure as indicated in Fig. 1 of the accompanying drawing, in which 1, 2 are the leads from an alternating current generator of any suitable type, the current waves at the generator assuming the jagged or pointed lines indicated in Fig. 2, which, as stated above, render the current objectionable for medical use. In the length of the leads 1 and 2, I interpose inductive resistances or reactances 3 which may be of the adjustable type if preferred, and as these resistances tend to prevent the rise of current, they also tend to prevent the dropping off thereof, and hence tend to prevent jagged points on the sine curve, and thus the sudden rise of current is resisted as is also the sudden fall of current, and therefore the true sine curve is caused to be approached by the alternating current passing through reactances 3, 3, and the current is thus rendered substantially sinusoidal in its nature, and suitable for administration to a patient, and may be taken off for this purpose at points 4, 4.

Intermediate the length of the leads 1 and 2, a chemical, balanced rectifier 5 is arranged, and this rectifier may be of the known type, consisting of an equilateral quadrangle of conductors having interposed in each side an asymmetrical cell 6. Diametrically opposite corners of the quadrangle are in electrical communication with the respective leads 1 and 2, and the other corners are engaged by conductors 7 and 8.

I have indicated by solid line arrows the direction of the positive component of the alternating current and have indicated by dotted line arrows the direction of the negative component of the alternating current, assuming for the sake of description, that the rise of current above the neutral line is positive and the drop of the current below the line is negative. Thus it will be seen that the positive component of the current flowing from lead 1 will pass down one side of the rectifier 5 and out through the conductor 7 passing at the terminal of said conductor through the patient being treated and back through conductor 8 to the opposite side of the rectifier 5 and to the lead 2 back to the generator. The negative component starting at the generator flows through lead 2 and through one side of the rectifier 5 to conductor 7 and from the terminal thereof through the patient to conductor 8 and through the opposite side of the rectifier 5 to the lead 1 and back to the generator. It is, of course, understood that the asymmetrical cells prevent the respective components from flowing in the wrong direction and the balanced arrangement of the rectifier 5 insures the following of the negative component of the alternating current along with the positive component on the conductor 7 so that a direct current is delivered at the terminals 9 and 10 of conductors 7 and 8, while an alternating current is delivered from the terminals 4.

I have found that even with the reactances 3 interposed in the leads, there may still be some variations in current which are painful to the patient, and to eliminate such variations and insure the delivery of an even current, I bridge the conductors 7 and 8 by an interposed asymmetrical cell 11 similar in its construction to any one of the cells 6, except possibly as to size or relative size of its parts, and the consistency of its electrolyte. The cell 11 is connected by conductors 12 and 13 with the respective conductors 7 and 8, and the potential difference which may be maintained between the conductors 12 and 13 by reason of resistance of cell 11 is standardized. That is to say, for instance the aluminum electrode of the cell 11 which is connected to conductor 12, according to the present accepted theory, will be coated with a filament of aluminum oxid sufficient for resisting a current say of 150 volts, and therefore a potential difference of 150 volts may be maintained at all times between the conductors 12 and 13, and when the current by any sudden fluctuation rises or attempts to rise in the conductor 7, the aluminum oxid filament will be broken down sufficiently to permit the excess current to flow through the cell 11 to conductor 13 and to conductor 8 without passing out through the terminals 9 and 10, so that the terminals 9 and 10 will be maintained at a constant difference of potential. Of course, the voltage named has merely been assumed for the purpose of illustration, and the resistance of the cell 11 may be fixed at any desired standard, which may be made variable as desired, by the provision of means for varying the space between the electrodes or the amount of surface exposure of the electrodes, or otherwise as preferred.

Obviously the cell 11 constitutes an electrolytic battery, and the battery if desired may consist of more than one cell, for as many cells may be provided as are found best adapted for accomplishing the desired results, and in fact it is obvious that more or less cells may be switched into and out of the bridge connections produced by conductors 12 and 13 with their connected battery for increasing or decreasing the resistances of the bridge. It will be further obvious that the cell 11 and any other cells which may be used in the battery at this point will be arranged with the aluminum anode in contact with the conductor 12, and the cathode in contact with the conductor 13.

While the present invention is particularly adapted for supplying current for therapeutical purposes, obviously current may be drawn from wires 7 and 8 for any purpose whatever, especially where evenness of current is desired.

I claim:—

1. In a device of the class described, the combination of a reactance interposed in an alternating current circuit for causing the current to approach the true sine curve for producing a sinusoidal current, an asymmetric cell rectifier for such circuit, and an asymmetric cell shunted across the leads from the rectifier said last-mentioned cell having an aluminum anode.

2. In a device of the class described, the combination of a chemical rectifier interposed in an alternating current circuit, a reactance interposed in each side of the circuit, conductors for delivering direct current from the rectifier, an asymmetric cell shunted across said conductors, and having an aluminum anode and conductors for delivering alternating current from the rectifier suitable for administration as a sinusoidal current.

3. In a device of the class described, the combination of a balanced chemical rectifier interposed in an alternating current circuit, means interposed in said circuit for nullifying fluctuations in the respective components of the alternating current, and an asymmetric cell shunted across the direct current leads from the rectifier said cell having an aluminum anode.

4. In a device of the class described, the combination of a chemical rectifier interposed in an alternating current circuit for transforming the alternating current into a direct current, means interposed in the alternating current circuit for causing the current curve to approach the true sine curve, and an asymmetric cell shunted across the conductors of the direct current circuit of the rectifier said last-mentioned cell having an aluminum anode.

5. In a device of the class described, the combination with a chemical rectifier interposed in an alternating current circuit for delivering a uni-directional current, and an asymmetric cell shunted across the direct current leads of the rectifier and disposed with the positive pole of the cell connected with the positive lead, and the negative pole of the cell with the negative lead said cell having an aluminum anode.

6. In an alternating current rectifier, the combination with a chemical rectifier interposed in an alternating current circuit, of an electrolytic battery bridged across the direct current leads of the chemical rectifier and having an aluminum anode and constructed to act as a condenser.

7. In an alternating current rectifier, a balanced chemical rectifier interposed in an alternating current circuit, and an electrolytic battery bridged across the direct current leads of the rectifier, each cell unit of said battery having an aluminum anode.

8. In an alternating current rectifier, a balanced chemical rectifier interposed in an alternating current circuit, and an asymmetrical cell bridged across the direct current poles of the rectifier and arranged with the current resisting element of the cell in communication with the positive direct current pole said cell having an aluminum anode.

9. In an alternating current rectifier, the combination with an alternating current circuit and a balanced chemical rectifier interposed therein and provided with asymmetrical cells, of means interposed in the alternating current circuit for reducing fluctuations of the respective components of the alternating current, and an asymmetrical cell bridged across the poles of the direct circuit from the rectifier said last mentioned cell having an aluminum anode.

10. In an alternating current rectifier, a chemical rectifier interposed in an alternating current circuit, and an asymmetrical cell bridged across the direct current poles and having an aluminum anode.

11. In an alternating current rectifier, a chemical rectifier disposed in an alternating current circuit, and an asymmetrical cell bridged across the direct current leads of the chemical rectifier and having an aluminum anode.

In testimony whereof I affix my signature in presence of two witnesses.

WILLIAM MEYER.

Witnesses:
 EDWARD BYRNES,
 C. P. McINERNEY.